(12) United States Patent
Hu et al.

(10) Patent No.: US 10,972,158 B2
(45) Date of Patent: Apr. 6, 2021

(54) DISTRIBUTED FD-MIMO: CELLULAR EVOLUTION FOR 5G AND BEYOND

(71) Applicant: Samsung Electronics Co., Ltd., Gyeonggi-do (KR)

(72) Inventors: Yeqing Hu, Garland, TX (US); Boon Loong Ng, Plano, TX (US); Young-Han Nam, Plano, TX (US); Jin Yuan, Richardson, TX (US); Gary Xu, Allen, TX (US); Ji-Yun Seol, Seongnam-Si (KR); Jianzhong Zhang, Plano, TX (US)

(73) Assignee: Samsung Electronics Co., Ltd., Suwon-si, (KR)

( * ) Notice: Subject to any disclaimer, the term of this patent is extended or adjusted under 35 U.S.C. 154(b) by 0 days.

(21) Appl. No.: 15/921,521

(22) Filed: Mar. 14, 2018

(65) Prior Publication Data

US 2018/0269939 A1    Sep. 20, 2018

Related U.S. Application Data

(60) Provisional application No. 62/472,330, filed on Mar. 16, 2017, provisional application No. 62/524,783, filed on Jun. 26, 2017.

(51) Int. Cl.
*H04B 7/0452* (2017.01)
*H04B 7/0456* (2017.01)
(Continued)

(52) U.S. Cl.
CPC ......... *H04B 7/0452* (2013.01); *H04B 7/0456* (2013.01); *H04B 7/0617* (2013.01);
(Continued)

(58) Field of Classification Search
CPC .. H04B 7/0452; H04B 7/0456; H04B 7/0617; H04B 7/0626; H04L 5/0051;
(Continued)

(56) References Cited

U.S. PATENT DOCUMENTS

| 9,999,074 B2 * | 6/2018 | Moon | H04B 7/0626 |
| 2012/0224556 A1 * | 9/2012 | Yoon | H04B 7/024 |
| | | | 370/329 |

(Continued)

OTHER PUBLICATIONS

3GPP TSG-RAN WG1 #87ah-NR, "On CSI-RS Pooling and Resource Allocation", R1-1700762 (Year: 2017).*

(Continued)

*Primary Examiner* — Peter Chen
*Assistant Examiner* — Intekhaab A Siddiquee

(57) ABSTRACT

A method for a user equipment (UE) is provided. The method comprises receiving, from a base station (BS), information via a dynamic signaling comprising at least one of a medium access control channel element (MAC CE) or downlink control information (DCI) that includes information for a set of channel state information-reference signal (CSI-RS); identifying CSI-RS resources each of which comprises a set of antenna ports based on the information; and measuring CSI using an aggregation of the CSI-RS resources, wherein an energy per resource element (EPRE) ratio between a CSI-RS and a physical downlink shared channel (PDSCH) is configured in the information to each of the CSI-RS resources comprising the aggregated CSI-RS resources.

20 Claims, 12 Drawing Sheets

(51) Int. Cl.
*H04B 7/06* (2006.01)
*H04W 74/08* (2009.01)
*H04L 5/00* (2006.01)
*H04W 74/00* (2009.01)

(52) U.S. Cl.
CPC ......... *H04B 7/0626* (2013.01); *H04L 5/0051* (2013.01); *H04W 74/006* (2013.01); *H04W 74/0833* (2013.01); *H04L 5/005* (2013.01); *H04L 5/0035* (2013.01); *H04L 5/0094* (2013.01); *Y02D 30/70* (2020.08)

(58) Field of Classification Search
CPC ..... H04L 5/0035; H04L 5/005; H04L 5/0094; H04W 74/006; H04W 74/0833; Y02D 72/1264; Y02D 72/20; Y02D 72/142; Y02D 72/146; Y02D 72/21; Y02D 72/00; Y02D 72/12; Y02D 72/1262; Y02D 72/126; Y02D 72/10
USPC .......................................................... 370/329
See application file for complete search history.

(56) References Cited

U.S. PATENT DOCUMENTS

| | | | |
|---|---|---|---|
| 2012/0281567 A1 | 11/2012 | Gao et al. | |
| 2013/0128832 A1* | 5/2013 | Kang .................. | H04W 72/042 370/329 |
| 2013/0273854 A1* | 10/2013 | Zhang .................. | H04B 7/0417 455/67.11 |
| 2013/0322376 A1* | 12/2013 | Mariner ............... | H04W 72/06 370/329 |
| 2014/0233457 A1* | 8/2014 | Koutsimanis .......... | H04J 11/005 370/328 |
| 2014/0334389 A1* | 11/2014 | Abdel-Samad ..... | H04W 74/004 370/329 |
| 2015/0365157 A1 | 12/2015 | Yang et al. | |
| 2016/0164588 A1 | 6/2016 | Chen | |

OTHER PUBLICATIONS

3GPP TSG-RAN WG1 #87ah-NR, "On CSI-RS Pooling and Resource Allocation", R1-1700762 (Year: 2017) (Year: 2017).*
"3rd Generation Partnership Project; Technical Specification Group Radio Access Network; Study on New Radio Access Technology Physical Layer Aspects (Release 14)," 3GPP TR 38.802, V14.2.0, Sep. 2017, 143 pages.
Andrews, J. et al., "What Will 5G be?," IEEE Journal on Selected Areas in Communications, vol. 32, No. 6, Jun. 2014, pp. 1065-1082.
Cox, C., et al., "Limits on the Performance of RF-Over-Fiber Links and Their Impact on Device Design," IEEE Transactions on Microwave Theory and Techniques, vol. 54, No. 2, Feb. 2006, pp. 906-920.
Dai, L., "An Uplink Capacity Analysis of the Distributed Antenna System (DAS): From Cellular DAS to DAS with Virtual Cells," IEEE Transactions on Wireless Communications, vol. 13, No. 5, May 2014, pp. 2717-2731.
Forenza, A., et al., "Achieving Large Multiplexing Gain in Distributed Antenna Systems via Cooperation with pCell Technology," IEEE Asilomar Conference on Signals, Systems, and Computers, Nov. 8-11, 2015, 8 pages.
Heath, R., et al., "A Current Perspective on Distributed Antenna Systems for the Downlink of Cellular Systems," IEEE Communications Magazine, Apr. 2013, pp. 161-167.
Lee, J., et al., "Coordinated Multipoint Transmission and Reception in LTE-Advanced Systems," IEEE Communications Magazine, Nov. 2012, pp. 44-50.
Nam, Y., et al., "Full-Dimension MIMO (FD-MIMO) for Next Generation Cellular Technology," IEEE Communications Magazine, Jun. 2013, pp. 172-179.
Ngo, H., et al., "Cell-Free Massive MIMO Versus Small Cells," IEEE Transactions on Wireless Communications, vol. 16, No. 3, Mar. 2017, pp. 1834-1850.
Shi, J., et al., "An Efficient Method for Enhancing TDD Over the Air Reciprocity Calibration," IEEE WCNC, 2011, pp. 339-344.
Wake, D., et al., "A Comparison of Remote Radio Head Optical Transmission Technologies for Next Generation Wireless System," IEEE, 2009, pp. 442-443.
Xu, G., et al., "Full Dimension MIMO (FD-MIMO)—Reduced Complexity System Design and Real-time Implementation," IEEE International Workshop on Signal Processing Systems, 2016, pp. 279-284.
International Search Report regarding Application No. PCT/KR2018/003108, dated Jun. 18, 2018, 3 pages.
Ericsson, "On CSI-RS Pooling and Resource Allocation", 3GPP TSG-RAN WG1 #87ah-NR, R1-1700762, Jan. 2017, 6 pages.
Ericsson, "Further discussion on CSI-RS pooling", 3GPP TSG-RAN WG1 #87, R1-1612352, Nov. 2016, 6 pages.

* cited by examiner

US 10,972,158 B2

DISTRIBUTED FD-MIMO: CELLULAR EVOLUTION FOR 5G AND BEYOND

CROSS-REFERENCE TO RELATED APPLICATIONS AND CLAIM OF PRIORITY

The present application claims priority to U.S. Provisional Patent Application Ser. No. 62/472,330, filed on Mar. 16, 2017; and U.S. Provisional Patent Application Ser. No. 62/524,783, filed on Jun. 26, 2017. The content of the above-identified patent document is incorporated herein by reference.

TECHNICAL FIELD

The present application relates generally to MIMO techniques for a wireless communication system. More specifically, this disclosure relates to FD-MIMO techniques in cellular evolution for 5G and beyond wireless communication systems.

BACKGROUND

The cellular industry may see a drastic growth in the wireless data traffic and emergence of new services in the next few years. The amount of data handled by wireless networks may exceed 500 exabytes by 2020. The 5G cellular system is expected to meet this demand by significantly improving certain key performance indicators, including spectral efficiency, user experienced data rate, peak data rate, areal traffic capacity, network energy efficiency, connection density, latency, and mobility. To bring 5G visions to commercialization, new radio (NR) standardization effort is well underway in the 3rd generation partnership project (3GPP), where the cellular technologies for millimeter wave bands may be introduced, and the fundamental aspects of cellular systems are being redesigned, including waveforms, numerologies, channel coding, and multi-input multi-output (MIMO) schemes. 5G NR MIMO schemes are set to encompass key 3GPP LTE MIMO technologies including single-user MIMO, full dimension MIMO (FD-MIMO), and coordinated multi-point (CoMP) transmission.

The FD-MIMO is the state-of-the-art MIMO technology for 3GPP long term evolution (LTE). The system features a 2D planar antenna array at the base station (BS), which enables tens of active antenna elements to be arranged in a feasible form factor, at operating carrier frequency below 6 GHz. The FD-MIMO provides significantly higher system throughput and improved user experience than the LTE MIMO systems prior to the LTE system.

However, to satisfy the data traffic requirements beyond 5G, the performance of FD-MIMO requires further improvements. In the present disclosure, a new FD-MIMO system, called distributed FD-MIMO (D-FD-MIMO), by spatially distributing the antenna elements of the BS throughout the cell is considered. In particular, the D-FD-MIMO is a multi-cell system, where each cell contains tens of distributed antenna elements performing MU-MIMO. In addition, the D-FD-MIMO achieves not only higher system throughput, but also more uniform user experience compared to an FD-MIMO.

SUMMARY

The present disclosure relates to a pre-5th-Generation (5G) or 5G communication system to be provided for supporting D-FD-MIMO for 5G communication system and beyond. Embodiments of the present disclosure provide multiple services in advanced communication systems.

In one embodiment, a user equipment (UE) comprises a transceiver configured to receive, from a base station (BS), information via a dynamic signaling comprising at least one of a medium access control channel element (MAC CE) or downlink control information (DCI) that includes information for a set of channel state information-reference signal (CSI-RS). The UE further comprises a processor operably connected to the transceiver, the processor configured to: identify CSI-RS resources each of which comprises a set of antenna ports based on the information; and measure CSI using an aggregation of the CSI-RS resources, wherein an energy per resource element (EPRE) ratio between a CSI-RS and a physical downlink shared channel (PDSCH) is configured in the information to each of the CSI-RS resources comprising the aggregated CSI-RS resources.

In another embodiment, a base station (BS) comprises a processor configured to identify information including channel state information-reference signal (CSI-RS) resources each of which comprises a set of antenna ports. The BS further comprises a transceiver operably connected to the processor, the transceiver configured to transmit, to a user equipment (UE), the information via a dynamic signaling comprising at least one of a medium access control channel element (MAC CE) or downlink control information (DCI) that includes a set of CSI-RS, wherein an aggregation of the CSI-RS resources is performed, and wherein an energy per resource element (EPRE) ratio between a CSI-RS and a physical downlink shared channel (PDSCH) is configured in the information to each of the CSI-RS resources comprising the aggregated CSI-RS resources.

In yet another embodiment, a method for a user equipment (UE) is provided. The method comprises receiving, from a base station (BS), information via a dynamic signaling comprising at least one of a medium access control channel element (MAC CE) or downlink control information (DCI) that includes information for a set of channel state information-reference signal (CSI-RS); identifying CSI-RS resources each of which comprises a set of antenna ports based on the information; and measuring CSI using an aggregation of the CSI-RS resources, wherein an energy per resource element (EPRE) ratio between a CSI-RS and a physical downlink shared channel (PDSCH) is configured in the information to each of the CSI-RS resources comprising the aggregated CSI-RS resources.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
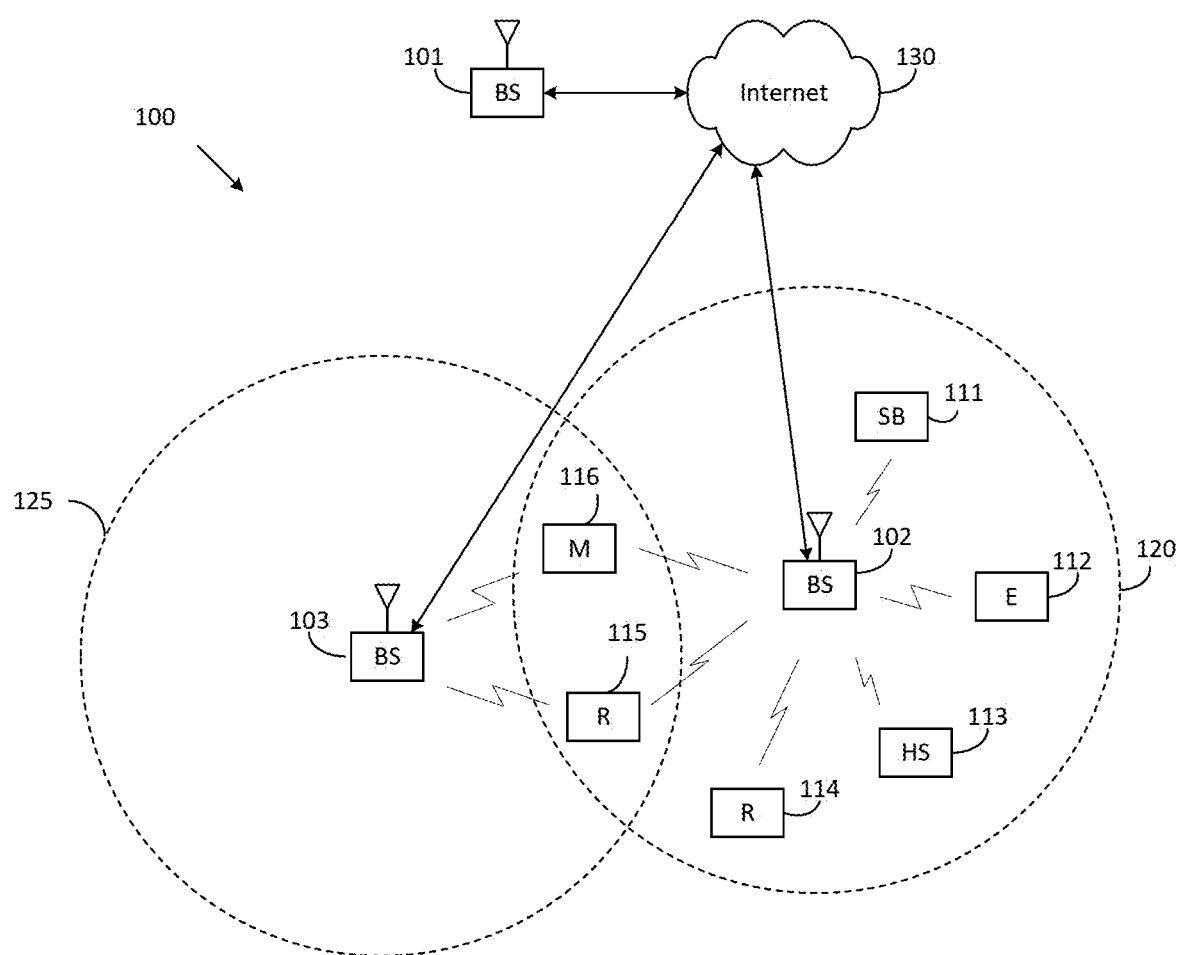
FIG. 1 illustrates an example wireless network according to embodiments of the present disclosure.

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: J. G. Andrews et al., "What Will 5G Be?," in *IEEE Journal on Selected Areas in Communications*, vol. 32, no. 6, pp. 1065-1082, June 2014; 3GPP TR 38.802 V14.2.0, Study on New Radio (NR) Access Technology; Physical Layer Aspects (Release 14); Y. H. Nam et al., "Full-dimension MIMO (FD-MIMO) for next generation cellular technology," in *IEEE Communications Magazine*, vol. 51, no. 6, pp. 172-179, June 2013; J. Lee et al., "Coordinated multipoint transmission and reception in LTE-advanced systems," in *IEEE Communications Magazine*, vol. 50, no. 11, pp. 44-50, November 2012; H. Q. Ngo, A. Ashikhmin, H. Yang, E. G. Larsson and T. L. Marzetta, "Cell-Free Massive MIMO Versus Small Cells," in *IEEE Transactions on Wireless Communications*, vol. 16, no. 3, pp. 1834-1850, March 2017; A. Forenza, S. Perlman, F. Saibi, M. Di Dio, R. van der Laan and G. Caire, "Achieving large multiplexing gain in distributed antenna systems via cooperation with pCell technology," 2015 *49th Asilomar Conference on Signals, Systems and Computers*, Pacific Grove, Calif., 2015, pp. 286-293; R. Heath, S. Peters, Y. Wang and J. Zhang, "A current perspective on distributed antenna systems for the downlink of cellular systems," in *IEEE Communications Magazine*, vol. 51, no. 4, pp. 161-167, April 2013; L. Dai, "An Uplink Capacity Analysis of the Distributed Antenna System (DAS): From Cellular DAS to DAS with Virtual Cells," in *IEEE Transactions on Wireless Communications*, vol. 13, no. 5, pp. 2717-2731, May 2014; C. H. Cox, E. I. Ackerman, G. E. Betts and J. L. Prince, "Limits on the performance of RF-over-fiber links and their impact on device design," in *IEEE Transactions on Microwave Theory and Techniques*, vol. 54, no. 2, pp. 906-920, February 2006; D. Wake, S. Pato, J. Pedro, E. López, N. Gomes and P. Monteiro, "A comparison of remote radio head optical transmission technologies for next generation wireless systems," 2009 *IEEE LEOS Annual Meeting Conference Proceedings*, Belek-Antalya, 2009, pp. 442-443; G. Xu et al., "Full Dimension MIMO (FD-MIMO)-Reduced Complexity System Design and Real-Time Implementation," 2016 IEEE International Workshop on Signal Processing Systems (SiPS), Dallas, Tex., 2016, pp. 279-284; and J. Shi, Q. Luo and M. You, "An efficient method for enhancing TDD over the air reciprocity calibration," 2011 *IEEE Wireless Communications and Networking Conference*, Cancun, Quintana Roo, 2011, pp. 339-344.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
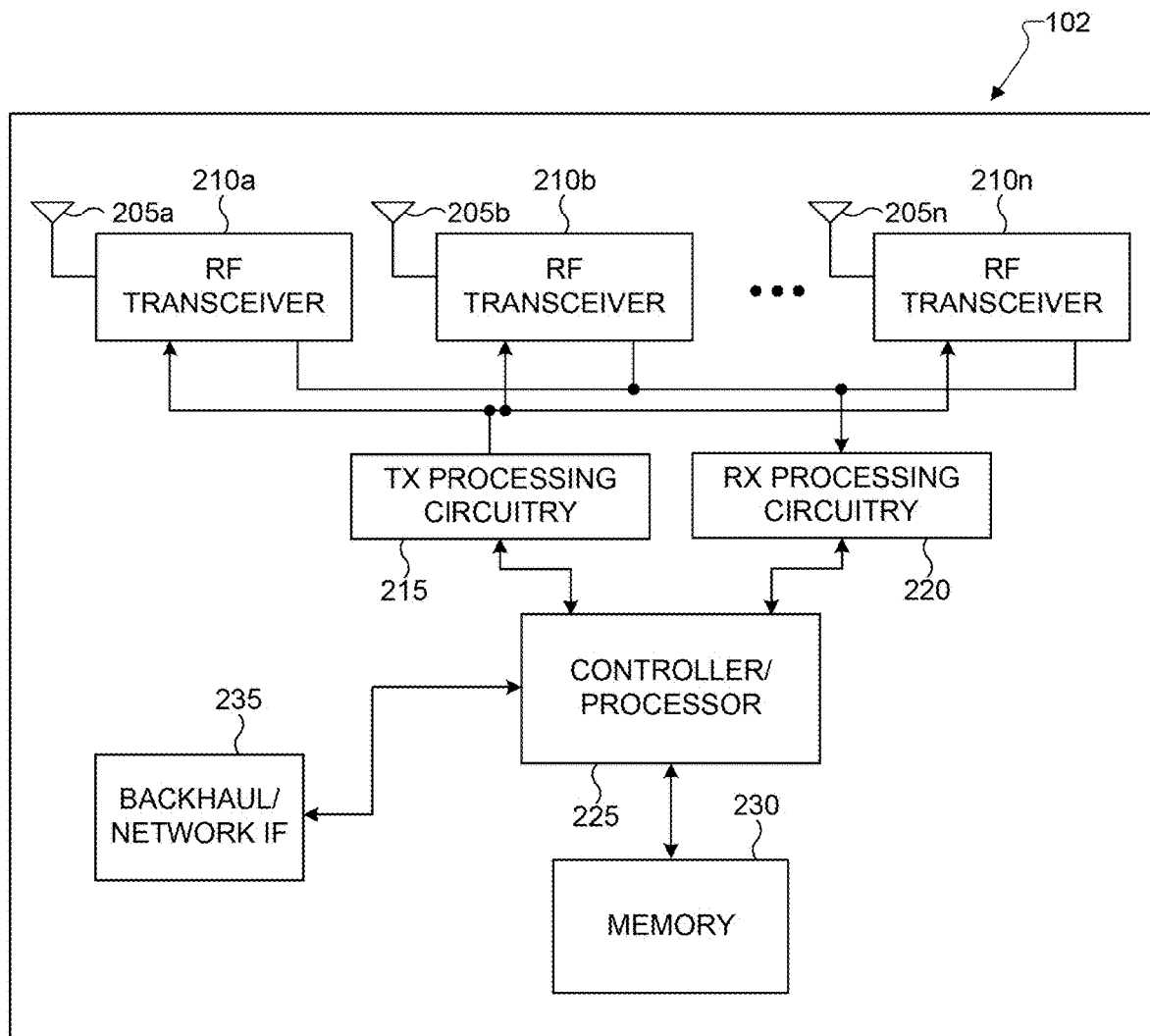
FIG. 2 illustrates an example eNB according to embodiments of the present disclosure.
Figure 3:
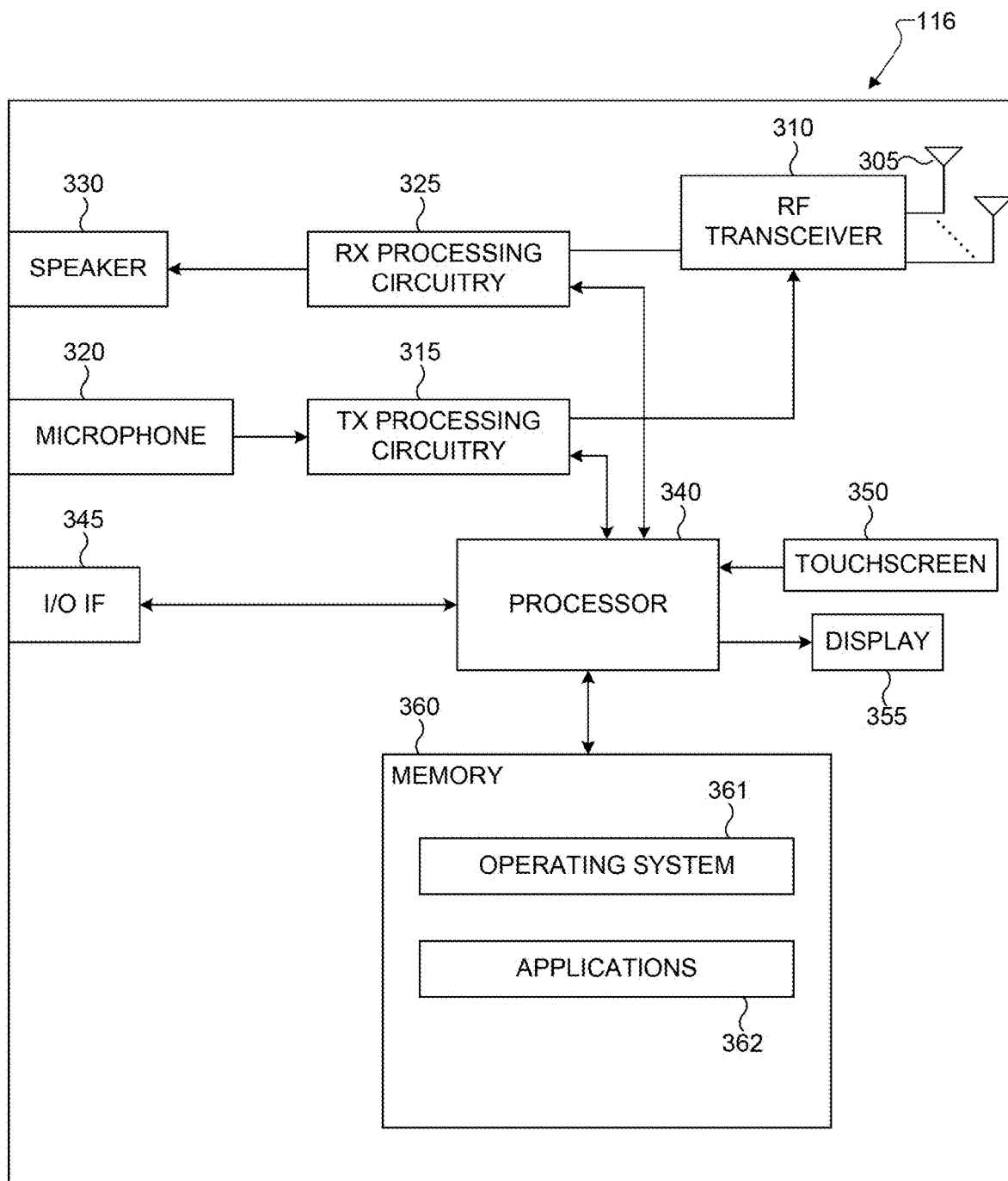
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in the present disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in the present disclosure to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient D-FD-MIMO operation in advanced wireless communication system. In certain embodiments, and one or more of the eNBs 101-103 includes circuitry, programming, or a combination thereof, for efficient D-FD-MIMO operation in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an inter-RAT handover operation and state transition. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A D-FD-MIMO is the next generation of FD-MIMO system for beyond 5G, which has the potential to increase the cell average throughput of conventional FD-MIMO by 1.4-2 times, while providing more uniform user experience. Due to practical deployment considerations such as hardware implementation of links between CU and RUs, D-FD-MIMO in a multi-cell setting is an important deployment scenario. In the present disclosure, inter-cell interference mitigation is considered as one of the key system design goals to further improve the performance of the D-FD-MIMO.

Figure 4A:
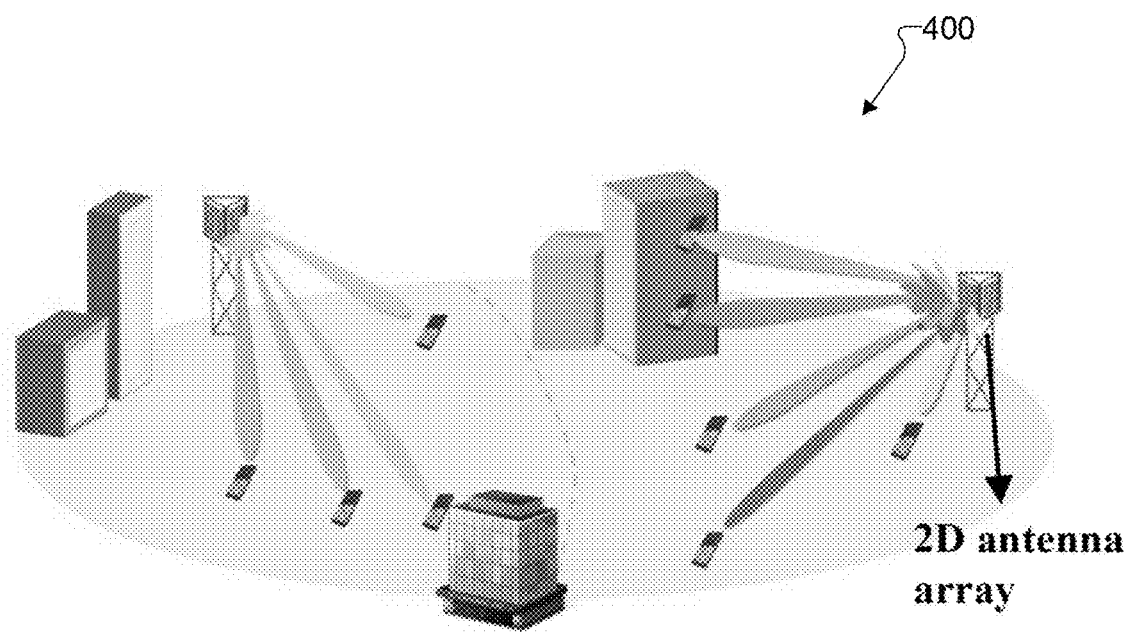
FIG. 4A illustrates an example FD-MIMO system according to embodiments of the present disclosure.

FIG. 4A illustrates an example FD-MIMO system 400 according to embodiments of the present disclosure. An embodiment of the FD-MIMO system 400 shown in FIG. 4A is for illustration only. One or more of the components illustrated in FIG. 4A can be implemented in specialized circuitry configured to perform the noted functions or one or more of the components can be implemented by one or more processors executing instructions to perform the noted functions. Other embodiments are used without departing from the scope of the present disclosure.

Figure 4B:
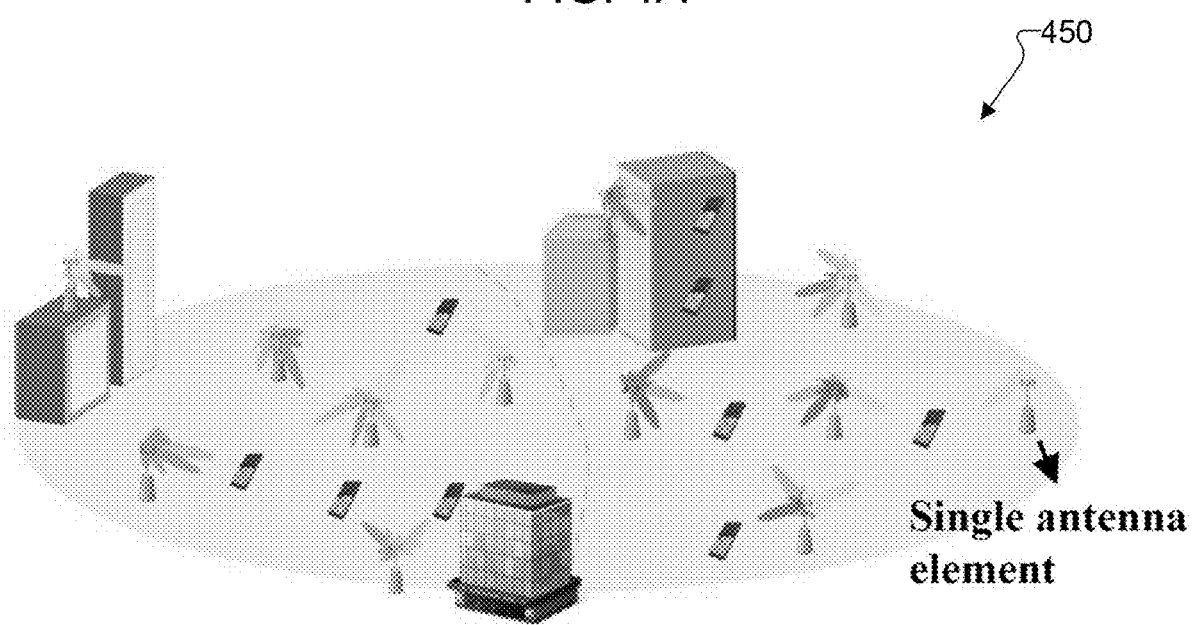
FIG. 4B illustrates an example D-FD-MIMO system according to embodiments of the present disclosure.

FIG. 4B illustrates an example D-FD-MIMO system 450 according to embodiments of the present disclosure. An embodiment of the D-FD-MIMO system 450 in FIG. 4B is for illustration only. One or more of the components illustrated in FIG. 4B can be implemented in specialized circuitry configured to perform the noted functions or one or more of the components can be implemented by one or more processors executing instructions to perform the noted functions. Other embodiments are used without departing from the scope of the present disclosure.

A D-FD-MIMO is an evolution of FD-MIMO. A D-FD-MIMO network may assume a cellular structure, where a cell is served by one BS and each BS is connected with a large number of antenna elements, of which the individual elements are spatially distributed in the cell. One or more antenna elements are equipped with a digital port, and the signals transmitted and received from all the antenna elements within one cell are jointly processed to perform high order MU-MIMO operation, as illustrated in FIGS. 4A and 4B.

Such a cellular system can be deployed outdoors in a city-wide area to provide service to both outdoor and indoor users. It can also be deployed inside the building to serve indoor users only. It is also suitable for providing service in a highly populated area, such as stadiums, shopping centers and airports, where a large number of users are densely located.

Concepts relating to D-FD-MIMO includes distributed massive MIMO, coordinated multipoint transmission (CoMP, a.k.a. network MIMO) and distributed antenna systems (DAS). Distributed massive MIMO treats the entire network as one cell, featuring an enormous number of access points distributed over a large area, jointly serving all the users pCell by Artemis can be seen as an implementation of the distributed massive MIMO albeit with a smaller scale in terms of the number of antennas. CoMP relies on the coordination among a few transmission points from the same or different sites to enhance user equipment (UE) experience at the cell edge.

DAS is initially proposed to improve coverage in an indoor cellular communication system, and is sometimes adopted in outdoor scenarios as well. One configuration for outdoor deployment is to have a few antenna arrays distributed throughout the cell to perform MIMO operations. Another DAS configuration deploys a number of individual antenna elements in a distributed manner in each cell of the network, which is similar to the D-FD-MIMO setting. Different from the present disclosure's system-level simulation approach, the analysis in theoretically derives the asymptotic sum capacity when the numbers of UE and antennas in each cell both approach infinity with their ratio fixed, and assuming perfect uplink power control.

In the present disclosure, the simulation assumptions and system design parameters such as the number of antenna elements per cell chosen for evaluation are only examples and do not imply limitations to the present disclosure. A comparison between D-FD-MIMO and conventional FD-MIMO is conducted. The network layout contains 19 cell sites in a hexagonal grid, each site serving a fixed number of co-channel UEs. The UEs are randomly located outdoors. The evaluation is performed under large scale channels with the path loss computed according to 3GPP channel models, and the phase computed according to line-of-sight (LoS) condition. No small-scale fading or multi-path is considered. Despite the simplified channel models, valuable insights can be obtained. A carrier frequency of 3.5 GHz for the simulation, which is a new candidate frequency in NR, is considered. Ideal channel state information (CSI) is assumed available at the BS, which is a reasonable assumption for a time division duplex (TDD) system.

Figure 5:
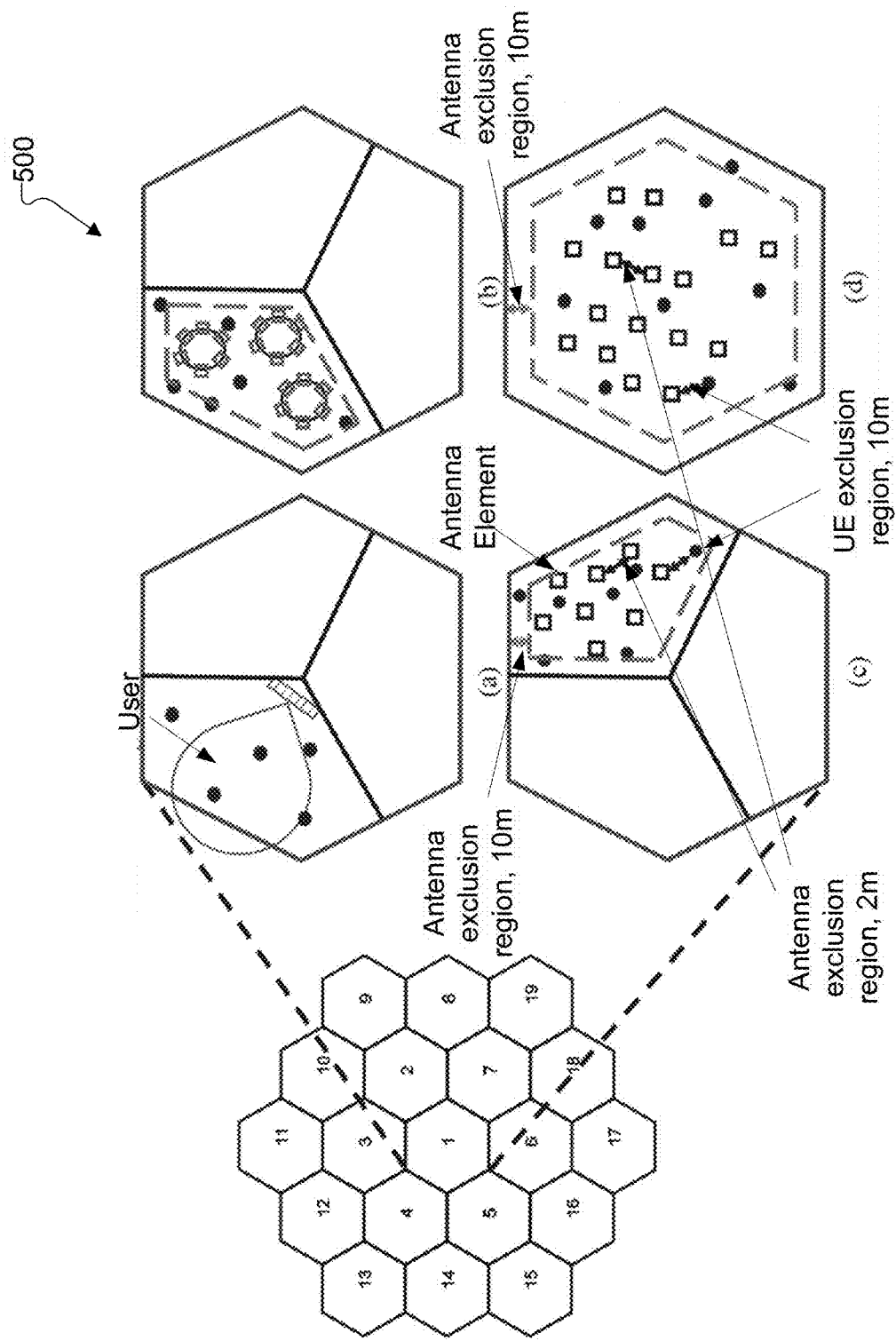
FIG. 5 illustrates an example evaluation scenario for FD-MIMO and D-FD-MIMO according to embodiments of the present disclosure.

FIG. 5 illustrates an example evaluation scenario 500 for FD-MIMO and D-FD-MIMO according to embodiments of the present disclosure. An embodiment of the evaluation scenario 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

The conventional FD-MIMO is assumed as the comparison baseline. The system level simulation is performed with 19 cell sites and 57 sectors (i.e., 3 sectors per cell site) deployed in a hexagonal grid. As shown in FIG. 5 (e.g, (a)), three 2D antenna arrays are deployed to serve one three-sector site. One antenna array is composed of 32 antenna elements, with 8H×4V elements and (0.5λ, 2λ) spacing in horizontal and vertical dimensions, respectively. Each element has a front-to-back ratio of 30 dB, peak antenna gain of 8 dB, and the half power beamwidth of 65° in both horizontal and vertical directions.

In the D-FD-MIMO evaluation, two scenarios can be considered. In one example, one site consists of three sectors. In another example, one site consists of one sector as shown in FIG. 5 (e.g., (c) and (d)).

For fair comparison with the FD-MIMO reference, one sector contains 32 or 96 distributed antenna elements, in the three-sector-per-site or one-sector-per-site D-FD-MIMO scenario, respectively. In each sector, the omni-directional antenna elements are randomly distributed with a minimum distance of 2 m, and an antenna exclusion region of 10 m from the sector edge which helps to reduce the inter-cell interference. The antenna elements in the same sector cooperate to perform MU-MIMO.

As a reference, in the present disclosure, the results for the D-FD-MIMO deployed as distributed circular arrays, as illustrated in FIG. 5 (e.g., (b)). In the present disclosure, a three-sector-per-site layout is considered, where each sector contains 4 circular arrays, each consisting of 8 omni-directional antenna elements. The spacing between two adjacent elements along the circumference is 0.5λ.

The system performance is evaluated for the scenarios described above. In the present disclosure, the intersite distances (ISD) of 200 m and 500 m are considered. A UE exclusion region of 10 m, where no UEs can reside, is imposed around each antenna, as defined by the 3GPP channel model. Denoting the region of a sector in a three-sector site as an area, the performance is evaluated with various numbers of UEs per area. SLNR (Signal-to-Leakage and Noise Ratio) precoding is employed by both the FD-MIMO and D-FD-MIMO, to serve all the UEs in the sector simultaneously with full bandwidth. The SLNR precoding is designed to maximize the ratio between the target UE signal and its generated interference to other UEs in the cell. It is computed as $W=H^H(H\ H^H+\sigma^{-2}I)^{-1}$ where H is the channel coefficients between all the antenna elements of the BS and all its serving UEs, and $\sigma^2$ is the received noise at each UE.

The signal-to-interference-noise ratio (SINR) cumulative distribution function (CDF) and the throughput are computed. It can be observed that when the ISD is smaller, FD-MIMO yields better cell average throughput than the D-FD-MIMO. However, when the ISD is larger, both scenarios of D-FD-MIMO achieve considerably higher cell average throughput over the FD-MIMO, yielding approximately 1.4 and 2 times gain, respectively. Interestingly, the D-FD-MIMO with a larger ISD yields approximately twice the cell-average throughput compared to the D-FD-MIMO with a smaller ISD, though the 5%-tile UE throughput slightly decreases.

On the other hand, such an increase in performance is not observed in the FD-MIMO. In addition, the D-FD-MIMO provides better 5%-tile UE throughput than the FD-MIMO.

The one-sector-per-site D-FD-MIMO achieves better performance than the three-sector-per-site D-FD-MIMO, even with the same antenna-to-UE number ratio, indicating that a larger cooperation antenna cluster is beneficial for D-FD-MIMO. In contrast, the circular array deployment does not provide cell average throughput gain over the D-FD-MIMO, and severely degrades the 5%-tile user throughput.

As a result, the evaluation results indicate that D-FD-MIMO outperforms FD-MIMO when the ISD is large, or in an isolated cell. Larger cooperation cluster is also more beneficial for D-FD-MIMO performance.

In some embodiments, the reasons behind the observations made about the three-sector-per-site D-FD-MIMO and FD-MIMO are considered.

As the ISD increases, an interesting observation is that the inter-cell interference is more dominant than the intra-cell interference for D-FD-MIMO, while the reverse is true for FD-MIMO. Moreover, the absolute difference between the two kinds of interference is significantly larger for D-FD-MIMO compared to that for FD-MIMO. It may be shown that for D-FD-MIMO in a multi-cell setting, mitigation of the inter-cell interference is an important system design goal to realize the full system performance potential of D-FD-MIMO.

In some embodiments, inter-cell interference is one of the main limiting factors of the D-FD-MIMO performance. To tackle this problem, there may be two schemes such as a multi-cell (MC) SLNR precoding and an antenna sharing scheme.

In some embodiments of multi-cell SLNR precoding, all the antenna elements of one BS jointly perform SLNR precoding to serve all its in-cell UEs, while suppressing interference to some of the UEs in other cells. If other-cell UE sees strong channel gain from the BS, it is beneficial to suppress the interference to it using MC-SLNR precoding, such that the UE does not receive strong interference from the BS. Similar to the SLNR, the MC-SLNR beamforming weight is calculated as: $W=H^H(H\ H^H+H_IH_I^H+\sigma^2I)^{-1}$ where H is the channel coefficients between all the antenna elements of the BS and its in-cell UEs, $H_I$ is the channel between the antenna elements and the other-cell UEs to be suppressed, and $\sigma^2$ is the received noise.

In some embodiments, the channel gain from a BS to other-cell UE for the purpose of selecting other-cell UEs for performing MC-SLNR precoding is given below: an average channel gain from all antenna elements in the cell to the other-cell UE; and/or the largest channel gain from all antenna elements in the cell to the other-cell UE.

Figure 6:
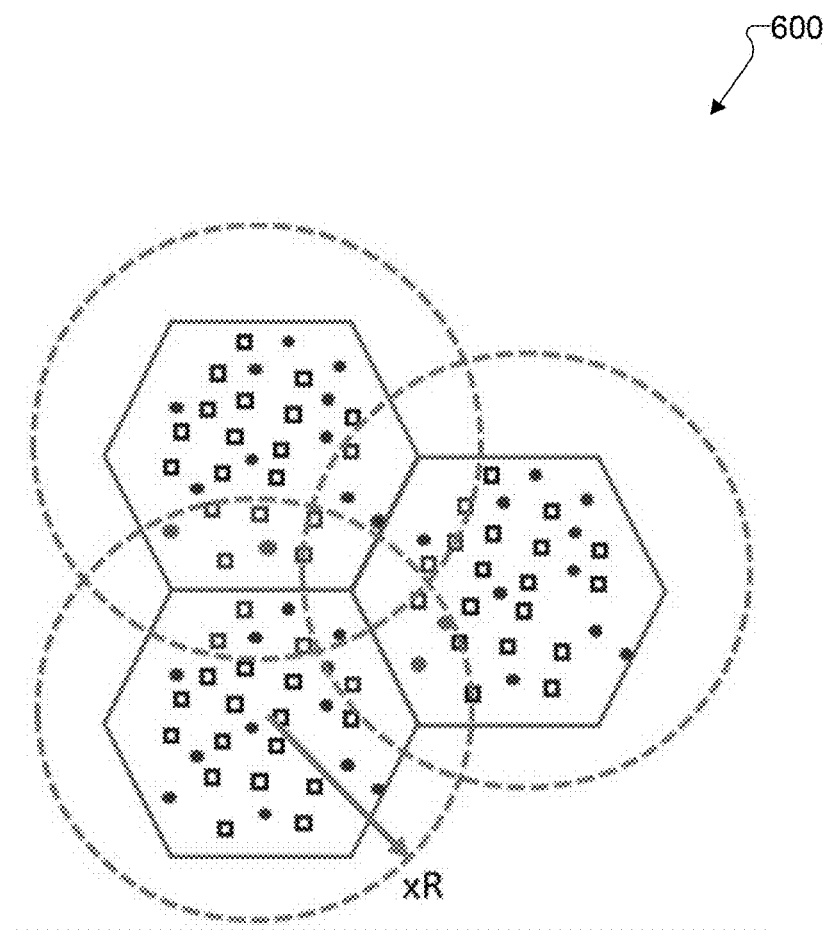
FIG. 6 illustrates an example antenna sharing scheme according to embodiments of the present disclosure.

FIG. 6 illustrates an example antenna sharing scheme 600 according to embodiments of the present disclosure. An embodiment of the antenna sharing scheme 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

In some embodiments, to further reduce inter-cell interference, an antenna sharing scheme is considered, where some of the antennas at the cell edge are connected to multiple cells such that they can be used by the multiple cells for precoding. TABLE 1 shows performance gain of antenna sharing scheme.

TABLE 1

Performance gain of antenna sharing schemes

|  | D-FD-MIMO (500 ISD, 1-cell-per-site) | D-FD-MIMO + MC-SLNR, (suppress 24 other-cell UEs) | Ants Share 1.2 R, MC-SLNR | Ants Share 1.5 R, MC-SLNR |
|---|---|---|---|---|
| 5-% tile throughput, bps/UE | 0.072 | 0.10 (1.39x) | 0.24 (3.33x) | 0.40 (5.56x) |
| Mean throughput, bps/UE | 1.13 | 1.13 (1.00x) | 1.20 (1.06x) | 1.40 (1.24x) |
| (average)#Antennas/Cell | 96 | 96 | ~166 | ~261 |
| (average)#UEs/Cell | 72 | 72 | 72 | 72 |

FIG. 6 illustrates an example of antenna sharing scheme, where the antennas within a certain radius (dashed circles) from the cell center are connected to the BS of the cell, and are used to serve the UEs in the cell. The antennas associated with multiple circles (light grey squares) belong to multiple cells. In this scheme, one BS has more antenna elements to perform MC-SLNR precoding. As a result, interference to other-cell UEs can be better suppressed (e.g. the light grey dot UEs).

In one example, the performance for antenna sharing is evaluated in a 1-cell-per-site setting with ISD=500 m, 96 antenna elements and 72 UEs per site, and the results are given in TABLE 1. In such example, the per-UE performance of D-FD-MIMO, D-FD-MIMO with MC-SLNR, and D-FD-MIMO with MC-SINR in conjunction with antenna sharing within 1.2 or 1.5 of the cell radius is compared. In such a heavily loaded system, the MC-SLNR provides limited performance gain especially for the cell average UEs; while MC-SLNR with antenna sharing yields larger gains for both the cell-edge and cell average UEs. Larger antenna sharing radius provides better performance, however the number of cooperating antennas also increases drastically, imposing high complexity for the implementation.

As shown in the aforementioned embodiments and examples, antenna sharing scheme provides considerable performance gain. However, it is beneficial to consider complexity reduction schemes for ease of implementation. Complexity reduction can be achieved using UE-specific antenna association schemes.

Figure 7:
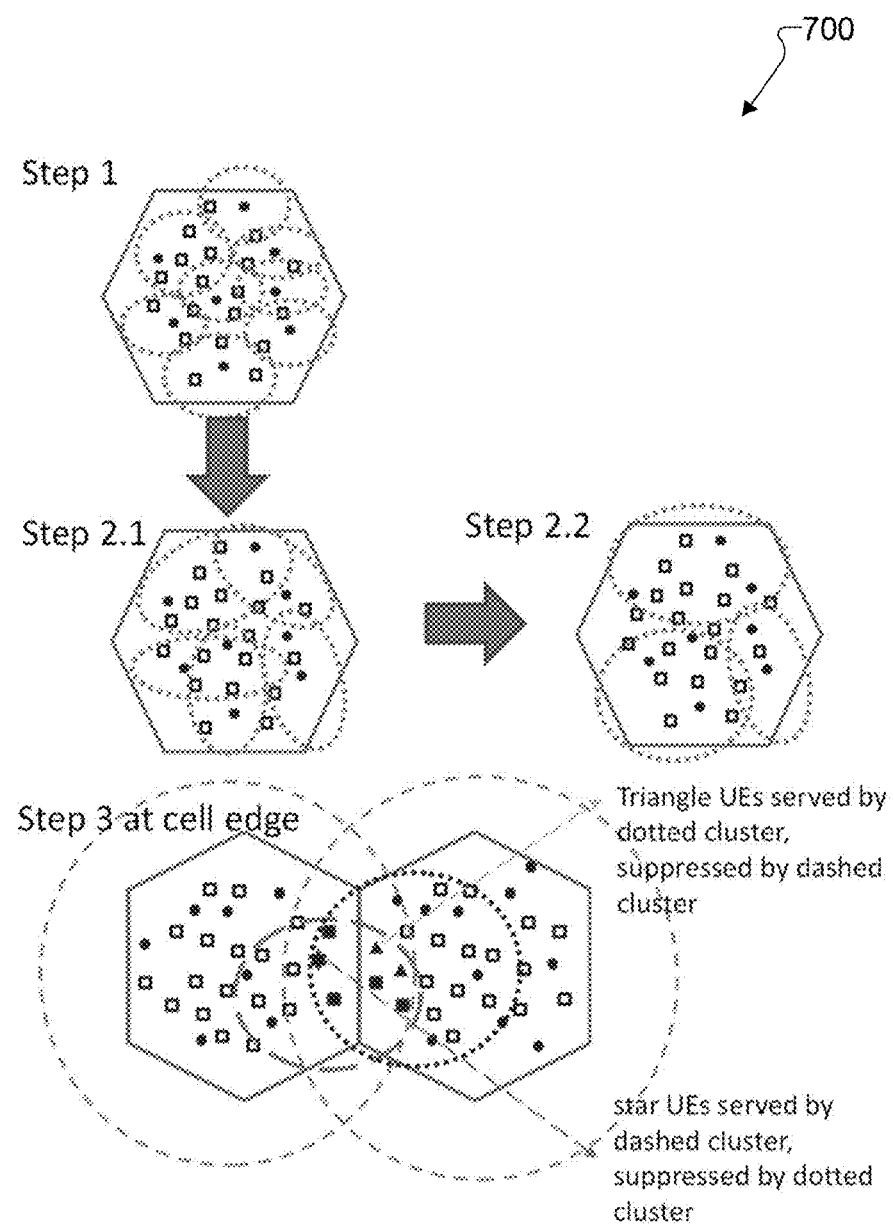
FIG. 7 illustrates an example UE-specific antenna association according to embodiments of the present disclosure.

FIG. 7 illustrates an example UE-specific antenna association 700 according to embodiments of the present disclosure. An embodiment of the UE-specific antenna association 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

In one embodiment, UE-specific antenna ports association is described as illustrated in FIG. 7. Variations of the steps are possible without departing from the principle of the present disclosure.

In step 1 of initial UE-specific antennas clustering, every UE is associated with the best set of antenna elements of its serving BS, including the elements shared by the serving BS and other BSs. In one example, the best set of antenna elements has the smallest path-loss to the UE.

In step 2, if an interference condition is satisfied, neighboring UE clusters are merged. In one example, assuming the UE-specific antenna clusters perform maximum ratio transmit (MRT) beamforming to serve its UEs, for any two UEs, their mutual SIR can be computed. For instance, consider UEs i and j, and their serving antenna clusters $C_i$ and $C_j$ performing MRT beamforming to them respectively. UE i and UE j receive signals $S_i$ and $S_j$ from their clusters, and interference $I_{ji}$ and $I_{ij}$ from the other UE's cluster. The mutual SIR between UEs i and j is the pair of $$SIR\left(\frac{S_i}{I_{ji}}, \frac{S_j}{I_{ij}}\right).$$

In sub-step 2.1 of step 2, when either of the mutual SIR between two UEs is below a threshold, the two UEs are causing strong interference to each other, implying that the two antenna clusters cannot effectively separate the UEs. If all the elements in the two clusters are connected with the same BS, they are merged into a bigger cluster. In sub-step 2.2 of step 2, if two bigger clusters contain overlapping UEs, they can be combined into an even bigger cluster.

In step 3, SLNR precoding per cluster formed after $2^{nd}$ step is performed. In such step 3, due to the antenna sharing scheme, the UEs at the cell edge can be associated with multiple clusters. In this situation, the UE is served by the antenna cluster belonging to its serving BS. The other clusters associated with the UE perform MC-SLNR precoding to suppress transmitted interference to the UE.

The beamforming weight is computed independently for each cluster. When an antenna element is shared by multiple clusters, the antenna's beamforming weight is superposed. If the transmitting power of an antenna element exceeds the maximum limit and the beamforming weight is computed according to SLNR principle, the power of every BF weight in the network is scaled down by the same factor. On the other hand, if MRT beamforming is deployed, only the power on antenna elements exceeding the limit needs to be truncated.

TABLE 2 shows performance of complexity reduction schemes by choosing proper cluster combining threshold (e.g. 15 dB) and antenna sharing radius.

TABLE 2

Performance of complexity reduction schemes

|  | Normal D-FD (baseline) | Ants Share 1.2 R, MC_SLNR | Cluster mutual SIR 15 dB | Cluster mutual SIR 20 dB | Ants Share 1.5 R, MC_SLNR |
|---|---|---|---|---|---|
| 5-% tile throughput, bps | 0.072 | 0.24 (3.33x) | 0.28 (3.89x) | 0.32 (4.44x) | 0.40 (5.56x) |
| Mean throughput, bps | 1.13 | 1.20 (1.06x) | 1.30 (1.15x) | 1.34 (1.19) | 1.40 (1.24 x) |
| #Ants/Site (cluster) | 96 | ~166 | ~105 | ~193 | ~261 |
| #UEs/Site (cluster) | 72 | 72 | ~40 | ~69 | 72 |

To realize D-FD-MIMO performance gain described in the aforementioned embodiments, one of the main hardware challenges over FD-MIMO is to distribute antennas throughout the cell, which results in the separation of a centralized unit (CU) and multiple remote units (RU). Similar system requirements on hardware in FD-MIMO may be met in D-FD-MIMO. These requirements include: all ADCs/DACs and RF transceivers need to have coherent clocks; both DL and UL signals are carried on the links between CU and RUs; and CU sends TDD and other control signals to all RUs. Power supply for RUs is another challenge for the D-FD-MIMO system. Normally two options are possible, namely local power supply or remote power supply through cables.

The links between CU and RUs can be seen as the front haul technology in wireless communications. Two main front haul technologies such as coaxial cable and optical fiber may be considered and applicable to D-FD-MIMO. Two front haul technologies are compared in TABLE 3. The optical fiber can be further categorized into digital and analogue links. Wireless-based front haul is not taken into account due to the requirements on real time processing and high bandwidth, and the challenges in deployment.

through the coaxial cable by analog signal overlay, in which the control signal is modulated to a narrow band signal and carried at a low frequency (e.g. a FSK signal at 50 MHz). In the meantime, the coaxial cable can serve as the media for the power supply of RU, which is a significant benefit to simply the deployment.

Similar to the coaxial cable, the analog optical fiber link transfers radio frequency (RF) signal from CU to RUs through optical fiber link, which is called RF over fiber technology (RFoF). It can support much longer distance which could be up to several kilometers. RFoF technology applies the photonic transceivers based on IM/DD modulation/demodulation schemes, which does not need the clock recovery at the demodulation side. Therefore, no extra frequency shift in the recovered RF signal is induced by the two transducers. Furthermore, the delay and phase rotation caused by the RFoF link is stable after each power on. Therefore, RFoF technology is a perfect candidate for the D-FD-MIMO system with the zero frequency shift and constant delay and phase rotation characteristics. In this setup, RU can be equipped with PA and LNA to compensate the power loss introduced by the pair of transducers at the two ends of the optical fiber link. The similar technology of

TABLE 3

Comparison of coaxial cable link, analog optical fiber link and digital optical fiber link

|  | Coaxial Cable Link | Analog Optical Fiber Link | Digital Optical Fiber Link |
|---|---|---|---|
| Max. Length of Link | Short (e.g. 50 m @ 3.5 GHz, 8 dB loss for ½" cable). | Long: >2 km. | Long: >2 km. |
| Partitioning Point | Before PA (TX) and after LNA (RX) | Before PA (TX) and after LNA (RX) | Before DAC (TX) and after ADC (RX) |
| Power Supply for RU | Local power or remote through coaxial cable. | Local power supply only. | Local power supply only. |
| TDD and Control Info. | Narrow band signal with analog signal overlay | Narrow band signal with analog signal overlay | Supported by the protocols. |
| Implementation Complexity | Low | Medium | High |
| Cost | Cable cost is high | Medium | High |

The maximum supported link distance is short when the links between CU and RUs are coaxial cable due to the fact that the cable loss is proportional to the cable length. RU is equipped with PA and LNA to mitigate the impact of the cable loss. TDD and control signal can be transmitted to RUs using narrow band side-band signal as in the coaxial cable link can be used for TDD and control information transfer for RFoF link.

The digital optical fiber link is based on common public radio interface (CPRI) or open base station architecture Initiative (OBSAI), which are two sets of protocols defining a flexible interface between CU and RUs. The optical fiber link based on the CPRI or OBSAI standards transfer framed I/Q sample data between CU and RUs, as well as the synchronization, and other user defined information. As a result, ADC/DAC and entire RF transceiver circuits are located in the RU, a major difference in partitioning between CU and RU compared to the analog (RFoF) optical links. The total cost is high and the implementation complexity, at least for RU, is much higher for the digital optical link.

Antenna calibration is a critical process to achieve the performance gain of D-FD-MIMO system running in TDD mode, in which the channel reciprocity is exploited. The purpose of the calibration is to compensate the different response of the transmitter and receiver circuit components. By deploying whole or part of the RF circuit on RU, the integrated calibration using the conventional scheme, is not feasible for D-FD-MIMO system, due to large separation of multiple RUs. One solution is through over-the-air (OTA) calibration, in which the calibration signal is transmitted and received wirelessly by a target transceiver.

Figure 8A:
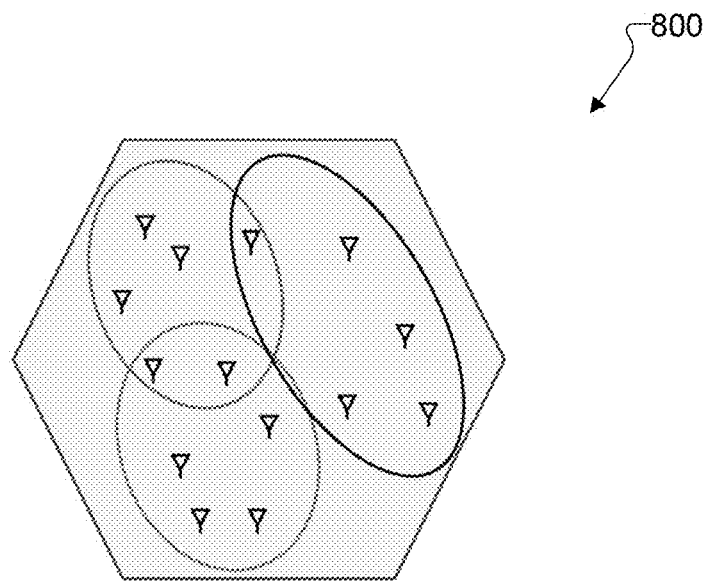
FIG. 8A illustrates an example OTA calibration in a cell group into three clusters with overlapping according to embodiments of the present disclosure.

FIG. 8A illustrates an example OTA calibration 800 in a cell group into three clusters with overlapping according to embodiments of the present disclosure. An embodiment of the OTA calibration 800 shown in FIG. 8A is for illustration only. One or more of the components illustrated in FIG. 8A can be implemented in specialized circuitry configured to perform the noted functions or one or more of the components can be implemented by one or more processors executing instructions to perform the noted functions. Other embodiments are used without departing from the scope of the present disclosure.

In a D-FD-MIMO system, each RU antenna can serve as the target antenna in OTA calibration due to the physically distributed RF circuits (especially PAs and LNAs). To deal with NLoS (NLoS between BS antennas) scenario, calibration operation can be achieved by a group based OTA calibration strategy, in which antennas are grouped with at least one overlapping antenna, and the calibration are performed group by group. The group based OTA calibration is shown in FIG. 8A where the distributed antennas are grouped into three clusters with overlapping antennas. In FD-MIMO, because of the compact array size, the purpose of power calibration is to balance the output power of each antenna element. Keeping the balance of the output power is not important in the D-FD-MIMO case due to different path losses in the distributed antenna array system.

A D-FD-MIMO testbed is developed by using existing FD-MIMO hardware to verify the concept of D-FD-MIMO, and obtained the initial test results for a performance comparison to the FD-MIMO system. The experimental setup consists of a FD-MIMO base station with 32 independent RF chains, of which one half of the 32 RF chains still connect to FD-MIMO collocated antennas, and the other half are connected to 16 distributed antennas through coaxial cables with length of ten meters each.

Figure 8B:
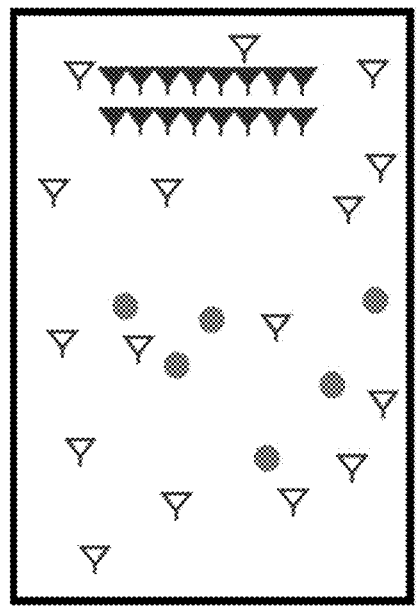
FIG. 8B illustrates another example OTA calibration in a cell group into three clusters with overlapping according to embodiments of the present disclosure.

FIG. 8B illustrates another example OTA calibration 850 in a cell group into three clusters with overlapping according to embodiments of the present disclosure. An embodiment of the OTA calibration 850 shown in FIG. 8B is for illustration only. One or more of the components illustrated in FIG. 8B can be implemented in specialized circuitry configured to perform the noted functions or one or more of the components can be implemented by one or more processors executing instructions to perform the noted functions. Other embodiments are used without departing from the scope of the present disclosure.

Six TDD UE emulators are connected to the system and the aggregate downlink throughput is monitored as the main system performance metric. After the antenna calibration, we switched between FD-MIMO and D-FD-MIMO by turning on/off the antenna groups dedicated for FD-MIMO and D-FD-MIMO. FIG. 8B shows the system setup and geometric distribution of antennas in D-FD-MIMO and FD-MIMO. The system was first running in D-FD-MIMO and switched to FD-MIMO by turning on FD-MIMO antenna group at 33.8 second. The average aggregate downlink throughput for D-FD-MIMO and FD-MIMO are 150 Mbps and 112 Mbps, respectively. The similar testing results was recorded when randomly changing the locations of the UE emulators.

LTE FD-MIMO was standardized in LTE specification where up to 16 channel state information reference signal (CSI-RS) ports can be configured to a UE. This is followed by enhanced FD-MIMO (eFD-MIMO) in LTE specification where the maximum number of supported CSI-RS ports is increased to 32. However, both FD-MIMO and eFD-MIMO were designed for co-located antennas.

Further MIMO evolution is underway with the on-going standardization of 5G NR. In NR MIMO, a single streamlined framework may be introduced to support the family of key 3GPP MIMO technologies including single-user MIMO, FD-MIMO and CoMP. Advanced CSI feedback that enables measurement and reporting of high resolution spatial information by the UE is also expected to be supported. Nevertheless, D-FD-MIMO represents a new deployment scenario yet to be studied in detail in 3GPP. Hence, further study would be needed on the enablers for supporting D-FD-MIMO under various conditions including a variety of indoor or outdoor environments, cell sizes, UE mobility, antenna densities, and UE densities.

Conventional cellular systems handle L3 mobility based on downlink measurement, e.g., based on cell-specific RS (CRS) in LTE. Support for L1/L2 mobility handling (intra-cell mobility) may be a major enhancement in 5G NR. However, the mobility handling for 5G NR is expected to remain inherently downlink measurement based. D-FD-MIMO requires support of an efficient mechanism to frequent UE-specific antenna set reconfiguration due to UE mobility. Hence, downlink based L1/L2 mobility may need to be enhanced to support low latency measurement and reporting cycle. UE measurement reporting overhead may also be minimized.

To circumvent the latency and UE reporting overhead incurred by the downlink based mobility mechanism, uplink based mobility can be considered. To support uplink based mobility, the UE can be configured to transmit an uplink reference signals (e.g., sounding RS (SRS) or physical random access channel (PRACH), either periodically or on-demand), which is to be measured at the antennas of the D-FD-MIMO network. Based on uplink measurement, the D-FD-MIMO network dynamically configures the set of antennas associated with each UE for CSI feedback, thereby avoiding the latency of measurement, antenna selection and reporting by the UE.

TABLE 4

Comparisons of standards impact between LTE eFD-MIMO, NR MIMO, and D-FD-MIMO.

| LTE eFD-MIMO (Rel-14) | NR MIMO (Rel-15) | D-FD-MIMO |
|---|---|---|
| Number of 32 | 32 (expected) | >32 |

TABLE 4-continued

Comparisons of standards impact between LTE eFD-MIMO, NR MIMO, and D-FD-MIMO.

| | LTE eFD-MIMO (Rel-14) | NR MIMO (Rel-15) | D-FD-MIMO |
|---|---|---|---|
| CSI-RS ports | | | |
| Advanced CSI feedback | Advanced rank 1-2 codebook for MU-MIMO | Higher resolution codebook | Similar resolution as NR MIMO. New codebook design (FDD) |
| L1/L2 mobility | RRC configured a set of CSI-RS resources with dynamic resource trigger (aperiodic & semi-persistent CSI-RS) | Expected to be similar to LTE eFD-MIMO | UL measurement assisted to reduce latency |
| L3 mobility | Based on CRS measurement | Based on measurement of SS block and possibly an additional cell-specific RS | Same as NR MIMO |

To enable UE-specific antenna association for the purpose of implementation complexity reduction as described previously, there is a need to specify an efficient UE procedure to dynamically change the set of antennas that the UE may measure for CSI acquisition, as the UE moves within the cell.

In one embodiment of approach 1, a UE-specific antenna set configuration can be performed as follows. In step 1, a gNB configures a set of CSI-RS resources to the UE via RRC signaling. Each CSI-RS resource represents the antenna element(s) of a transmission/reception point of a D-FD-MIMO system. In one example, each CSI-RS resource is either one or two ports. There can be an identifier associated with each CSI-RS resource. The CSI-RS resources can be mapped to orthogonal resource elements (in time/frequency/code domain). To facilitate resource reuse, the same resource elements can also be assigned to different CSI-RS resources provided they are sufficiently far apart. The physical signal of CSI-RS can be scrambled with resource-specific value to mitigate the interference between the resources.

Figure 9:
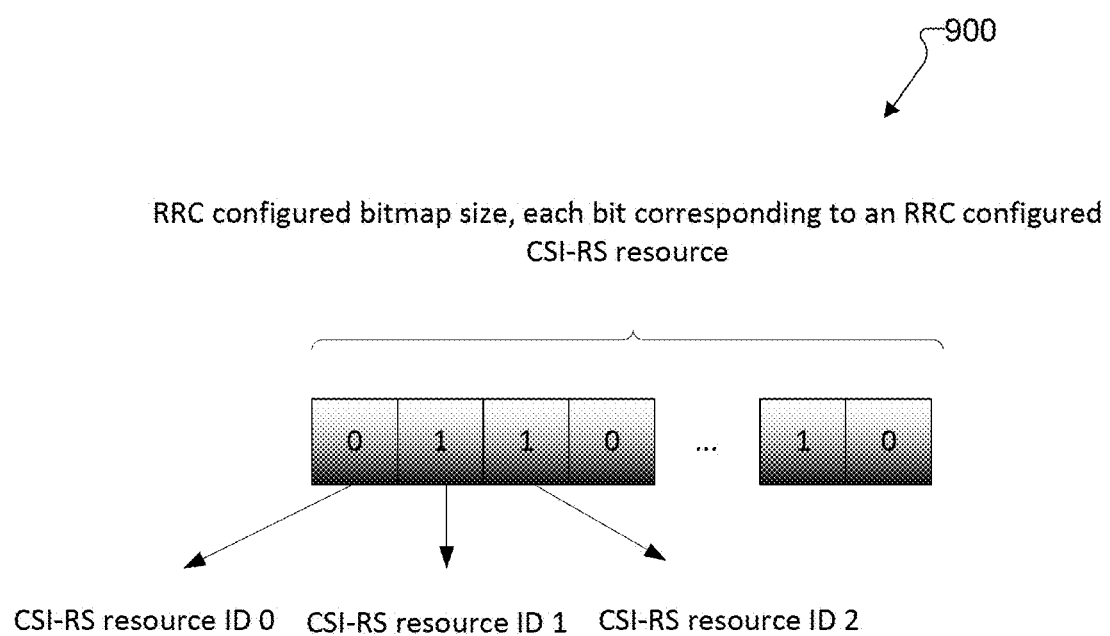
FIG. 9 illustrates an example MAC or DCI signaling of a bitmap corresponding to RRC configured CSI-RS resources to be added or removed for CSI acquisition according to embodiments of the present disclosure.

In step 2, the UE may only measure a subset of the antenna ports for CSI acquisition. The set of ports to be measured is an aggregate of a subset of CSI-RS resources configured in step 1. The initial subset of CSI-RS resources can be configured by another RRC signaling or a dynamic signaling, such as MAC control element (CE) or dynamic control information (DCI) signaling. For dynamic signaling, the MAC CE or DCI signaling can indicates the set of identifiers from the configuration in step 1. For example, a bitmap of RRC configured CSI-RS resources a bit value of 1 can be associated with each of the identifiers corresponding to the antenna ports to be added; whereas a bit value of 0 can be associated with each of the identifiers corresponding to the antenna ports to be removed. An example is illustrated in FIG. 9. In another example, the dynamic signaling indicates the indices of the resource identifiers to be measured.

FIG. 9 illustrates an example MAC or DCI signaling of a bitmap 900 corresponding to RRC configured CSI-RS resources to be added or removed for CSI acquisition according to embodiments of the present disclosure. An embodiment of the MAC or DCI signaling of a bitmap 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In step 3, to support dynamic addition and removal of one or more antenna ports/resources for CSI acquisition, a MAC CE or DCI signaling can be defined to add and/or remove one or more antenna ports/resources. The MAC CE signaling can be the same as that used in step 2. In one example, two separate MAC CE or DCI signaling can be defined, one for addition of one or more antenna ports; another for removal of one or more antenna ports. For the dynamic signaling of antenna port addition using a bitmap, the bitmap size can be limited to only resources that are not currently activated for overhead saving. Likewise, for the dynamic signaling of antenna port removal using a bitmap, the bitmap size can be limited to only resources that are currently activated.

Figure 10:
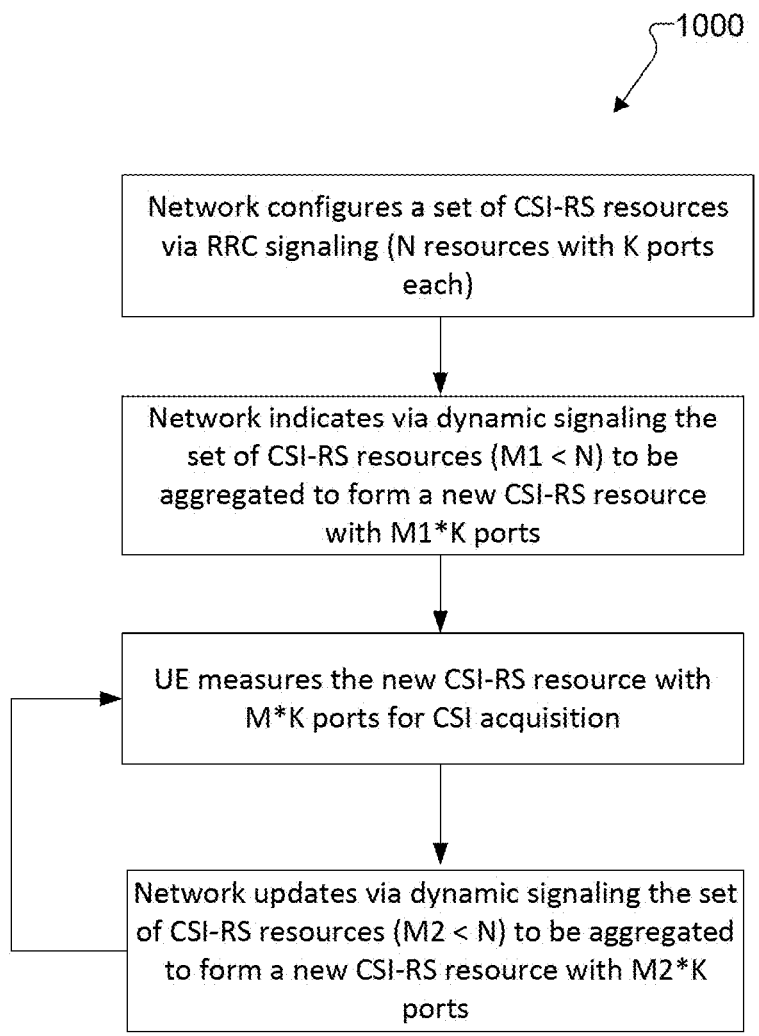
FIG. 10 illustrates a flow chart of a method for UE-specific antenna port association according to embodiments of the present disclosure.

FIG. 10 illustrates a flow chart of a method 1000 for UE-specific antenna port association according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

The procedure according to the aforementioned embodiments of the first approach is illustrated in FIG. 10. For dynamic signaling using DCI in step 2 and/or step 3, a new DCI format can be defined for the purpose of adding/removing one or more antenna ports. The UE can use its configured C-RNTI (UE ID) to receive the DCI format (e.g. the DCI format CRC is scrambled with the RNTI). In one example, a separate RNTI is defined for this purpose.

Step 3 implies that the number of antenna ports for CSI acquisition may dynamically change over time. More than one set of CSI-RS antenna ports can be maintained using the above procedure. In this case, there can be an additional identifier in the dynamic signaling to identify the different measurement set or process that the additional/removal is corresponding to. In another method, a first set of CSI-RS antenna ports for CSI acquisition is maintained using the above procedure but there is another parallel procedure used for maintaining a second set of CSI-RS resources through UE measurement of the CSI-RS resources with simpler measurement metric such as reference signal received power (RSRP) or reference signal received quality (RSRQ) measurement or the like.

The procedure for the second set is useful for providing the network measurement results which is the basis for the network to decide the antenna ports to be included in the first set. The dynamic signaling to maintain the set of CSI-RS resources for RSRP/RSRQ measurement or the like is independent from the dynamic signaling to maintain the set of CSI-RS resources for CSI acquisition. In one embodiment, they are jointly indicated by the same dynamic signaling, in which case a measurement set or process identifier is needed in the dynamic signaling to differentiate them. As alternative to the RSRP/RSRQ measurement procedure, the UE can be configured to transmit sounding signals such as SRS or PRACH, which the network measures to determine the first set of CSI-RS antenna ports.

In some embodiments of approach 2, a UE-specific antenna set configuration can be performed as follows. In step 1, a gNB configures a set of CSI-RS resources to the UE via RRC signaling. Each CSI-RS resource represents the antenna element(s) of a transmission/reception point of a D-FD-MIMO system. In one example, each CSI-RS resource is either one or two ports. There can be an identifier associated with each CSI-RS resource. The CSI-RS resources can be mapped to orthogonal resource elements (in time/frequency/code domain). To facilitate resource reuse, the same resource elements can also be assigned to different CSI-RS resources provided they are sufficiently far apart. The physical signal of CSI-RS can be scrambled with resource-specific value to mitigate the interference between the resources.

In step 2, the UE is configured a dedicated physical random access channel (PRACH) preamble by the BS.

In step 3, the BS triggers transmission of the dedicated PRACH preamble by the UE, e.g. via a physical downlink control channel (PDCCH) order, and the UE transmits the dedicated PRACH upon receiving the trigger. In another alternative, a higher layer signaling configures the periodicity of PRACH transmission to be performed the UE, and the UE transmits the dedicated PRACH accordingly. Alternatively, the UE autonomously triggers the PRACH transmission according to a predefined or configured criterion. In one example, the trigger criterion can be the CQI of the current set of antenna ports are below a certain threshold. Other metric can also be considered such as RSRP/RSRQ of one or more CSI-RS resources configured by RRC in Step 1.

In step 4, the BS detects the dedicated PRACH at more than one antenna ports and determines the set of antenna ports that may be associated with the UE for CSI acquisition. The set can be determined based on the PRACH signal strength.

In step 5, the BS transmits a random access response (RAR) including the set of CSI-RS antenna ports that the UE may measure for CSI acquisition. The RAR includes the CSI-RS resource identifiers configured in step 1, and the RAR updates (activates) the CSI-RS ports/resources to be measured is the aggregation of the CSI-RS resources. The rest of the CSI-RS ports/resources are deactivated. In one example, if step 1 is not present, the RAR in step 4 indicates the full CSI-RS resource configuration.

Figure 11:
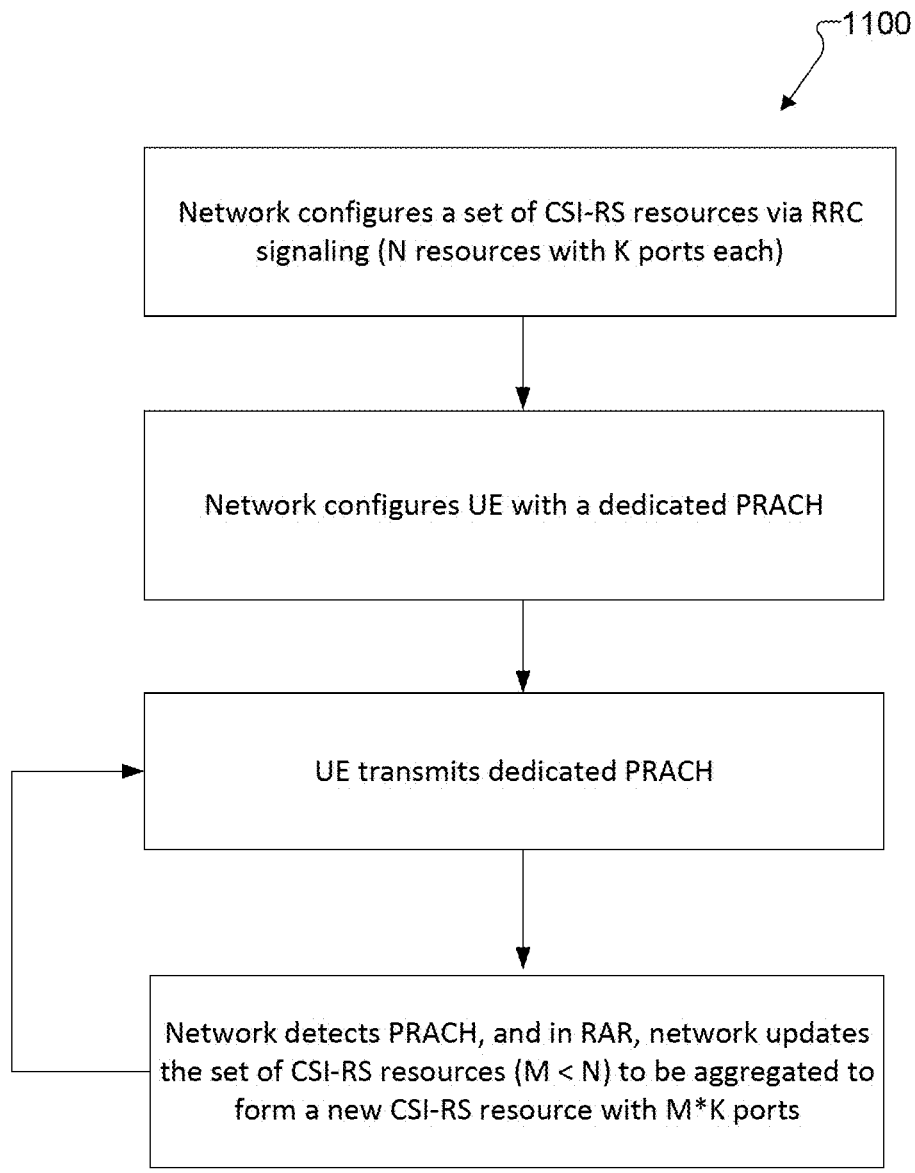
FIG. 11 illustrates another flow chart of a method for UE-specific antenna port association according to embodiments of the present disclosure.

FIG. 11 illustrates another flow chart of a method 1100 for UE-specific antenna port association according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

Step 3 to step 5 are performed from time to time for moving UE in order to keep track of the proper antenna set for the UE. Instead of network triggering of PRACH, the PRACH can also be configured to be periodically transmitted by the UE, which is beneficial for saving downlink signaling overhead. The procedure according to the second approach is illustrated in FIG. 11.

In some embodiments, PRACH can be replaced with SRS or SR. In this case, RAR can be replaced with a special DL response to the SRS and SR, transmitted either on PDSCH scheduled by PDCCH or on a DCI on a PDCCH. Alternatively, the DL response in the approach 1 (step 3) or in the approach 2 (step 5 or its alternative as described above) may comprise a UL grant DCI on a PDCCH transmitted in slot n, which triggers aperiodic CSI-RS or semi-persistent CSI-RS in slot $n+k_1$, and also triggers a CSI report on the scheduled PUSCH in $n+k_2$, where $k_1=0, 1, 2, \ldots, k_2 \geq k_1$.

In some embodiments, the DL response in the aforementioned approach 1 (step 3) or in the aforementioned approach 2 (step 5 or its alternative as described above) may comprise a DL assignment DCI to schedule a MAC CE on a PDSCH, which comprises an information: (1) to update (add/remove)/activate/deactivate the CORESETs from a pool of CORESETs or CORESET configurations (e.g., for update of QCL CSI-RS resource association for the activated CORESETs) and/or; (2) to activate/deactivate the CSI-RS resources from the configured CSI-RS resource pool, and/or; (3) to update the CSI-RS resource pool (i.e., add/remove CSI-RS ports/resources to/from the pool) and activate a subset of the CSI-RS resources from the updated pool, and/or; (4) that is a UL grant at least for triggering the CSI report for the activated/updated CSI-RS resources; and/or (5) UL PC configuration (e.g., to use CSI-RSRP derived from the updated pool of CSI-RS resources, with measurement restriction).

The scheduled PUSCH may include a UE recommendation to update/activate/deactivate the CORESETs or CORESET configurations. A separate CORESET may be configured for this purpose, separately from CORESETs configured for other "normal" UL grant DCIs. In this CORESET, the field to trigger the AP/SP CSI-RS may be able to indicate CSI-RS resources from a larger/different pool than the other CORESETs.

In some embodiments, the special type of DL response transmitted in slot n may also trigger an aperiodic CSI-RS or semi-persistent CSI-RS in slot n+k.

Both approach 1 and 2 can be performed in parallel for managing two sets of antenna ports. Which approach e.g., out of approaches 1 and 2 to be used for control (PDCCH) and data (PDSCH) may be explicitly indicated by RRC signaling. The signaling can be per CORESET, per DL transmission mode, per CC, per BWP, or for each of PDCCH and PDSCH on a CC/BWP. Alternatively, for PDCCH, approach 2 may be used; and for PDSCH, approach 1 may be used.

In one embodiment, for (UE-group) common PDCCH and (UE-group) common PDSCH/"fall back" PDCCH/PDSCH, approach 2 may be used (in idle mode & RRC connected mode); and for unicast PDCCH and PDSCH, approach 1 may be used (in RRC connected mode).

In one embodiment, for (UE-group) common PDCCH and (UE-group) common PDSCH, approach 2 may be used; and for unicast PDCCH and PDSCH, approach 1 may be used.

Since different antenna port can be shared by different set of UEs, the power (EPRE) ratio of the CSI-RS RE to the PDSCH RE (or the EPRE of the PDSCH RE to the CSI-RS RE) can be different for different CSI-RS antenna port/resource. To enable dynamic MU-MIMO signaling, the EPRE ratio information per CSI-RS resource/port can be indicated in the dynamic signaling. In one alternative, the indication is an n-bit explicit and/or separate signaling. In another alternative, the indication is jointly coded in the signaling for updating the CSI-RS resource/ports to be measured by the UE (step 2/3 of the approach 1 and step 5 of the approach 2). A default EPRE ratio value can be RRC configured and only the difference (if present) is indicated in the dynamic signaling.

In another alternative, the EPRE information per CSI-RS resource/port is RRC configured to save dynamic signaling overhead with some limitation in the scheduling flexibility. In another alternative, the EPRE ratio information per CSI-RS resource/port can be indicated in aperiodic CSI-RS triggering field and/or aperiodic CSI report triggering field. In another alternative, the EPRE ratio information per CSI-RS resource/port can be indicated in the dynamic signaling.

The EPRE ratio of a CSI-RS resource may be configured in RRC signaling to be either a fixed value or a set of variable values. For example, for a CSI-RS resource, the EPRE is configured to be {x dB, y dB}. For this CSI-RS resource, in one example, unless otherwise indicated, the EPRE ratio is x dB by default; and the UE is explicitly indicated to use y dB either dynamically by DCI or semi-dynamically by MAC CE. In another example, the UE is explicitly indicated to use either of x and y dB either dynamically by DCI or semi-dynamically by MAC CE.

The UE may be RRC configured with multiple CSI-RS resource settings, in which one resource setting has a single power ratio, and another resource setting has multiple candidate values for the power ratio. The MAC CE or DCI signaling to indicate which power ratio to use may be applicable for the resource setting which has multiple candidate power ratio values.

The UE may be RRC configured with a CSI-RS resource setting, for which one resource has a single power ratio, and another has multiple candidate values for the power ratio. The MAC CE or DCI signaling to indicate which power ratio to use may be applicable for the resource setting which has multiple candidate power ratio values. The UE can be further indicated to aggregate multiple CSI-RS resources to derive a single set of CSI (CRI/PMI/CQI/RI, etc.) dynamically in a DCI, in which case the UE may assume the semi-dynamically indicated power ratios for individual CSI-RS ports/resources in the aggregated resource.

In one example, the UE is RRC configured with CSI-RS resources 0-3 with a fixed power ratio of 6 dB, and CSI-RS resources 4-7 with two candidate power ratio values of {+6 dB, +3 dB}, and the UE is further RRC configured or hard coded with default power ratio values to use for resources 4-7. The power ratios can be updated by MAC CE signaling; the UE may receive a MAC CE signaling to update the power ratios to {+6 dB, +3 dB, +3 dB, +6 dB} respectively for resources {4, 5, 6, 7}. The UE may further receive an aperiodic/semi-persistent CSI-RS triggering of CSI-RS resources {3, 4, 5, 6} to report aperiodic CSI report on a CSI-RS resource constructed with aggregating the triggered CSI-RS resources i.e., {3, 4, 5, 6}. Then the UE derives CSI on the aggregated CSI-RS resource, with assuming the power ratios as indicated; for the ports in resources 3 and 4, the UE uses power ratio+6 dB as configured by RRC, and for the ports in resources 5 and 6, the UE uses power ratio+6 dB, +3 dB as indicated in the MAC CE.

In some embodiments as described in the aforementioned embodiments, different antenna port can be shared by multiple cells. If the CSI-RS physical signal is scrambled by cell-specific value such as the cell id, the cell id of the CSI-RS resource/port needs to be indicated to the UE, e.g. in the RRC signaling in step 1 of both the first and the second approaches. If the information is not configured, the UE may assume the cell id is the same as the serving cell id.

The scrambling IDs (to indicate a CSI-RS scrambling initialization) may be configured explicitly per CSI-RS resource. In this case, the UE may be configured to derive CSI using a CSI-RS resource aggregation, comprising CSI-RS resources whose scrambling IDs are potentially different.

The scrambling ID and power ratio may be jointly configured and/or indicated for a resource. In one example, RRC signaling may indicate two candidate pairs of power ratio and scrambling ID for a CSI-RS resource. For example, a UE is configured with two candidate pairs of {(+6 dB, SCID1), (+3 dB, SCID2)} for a CSI-RS resource, and the UE is further indicated in MAC CE and/or in DCI to use one of the two candidates to use for the CSI-RS resource for deriving CSI.

Figure 12:
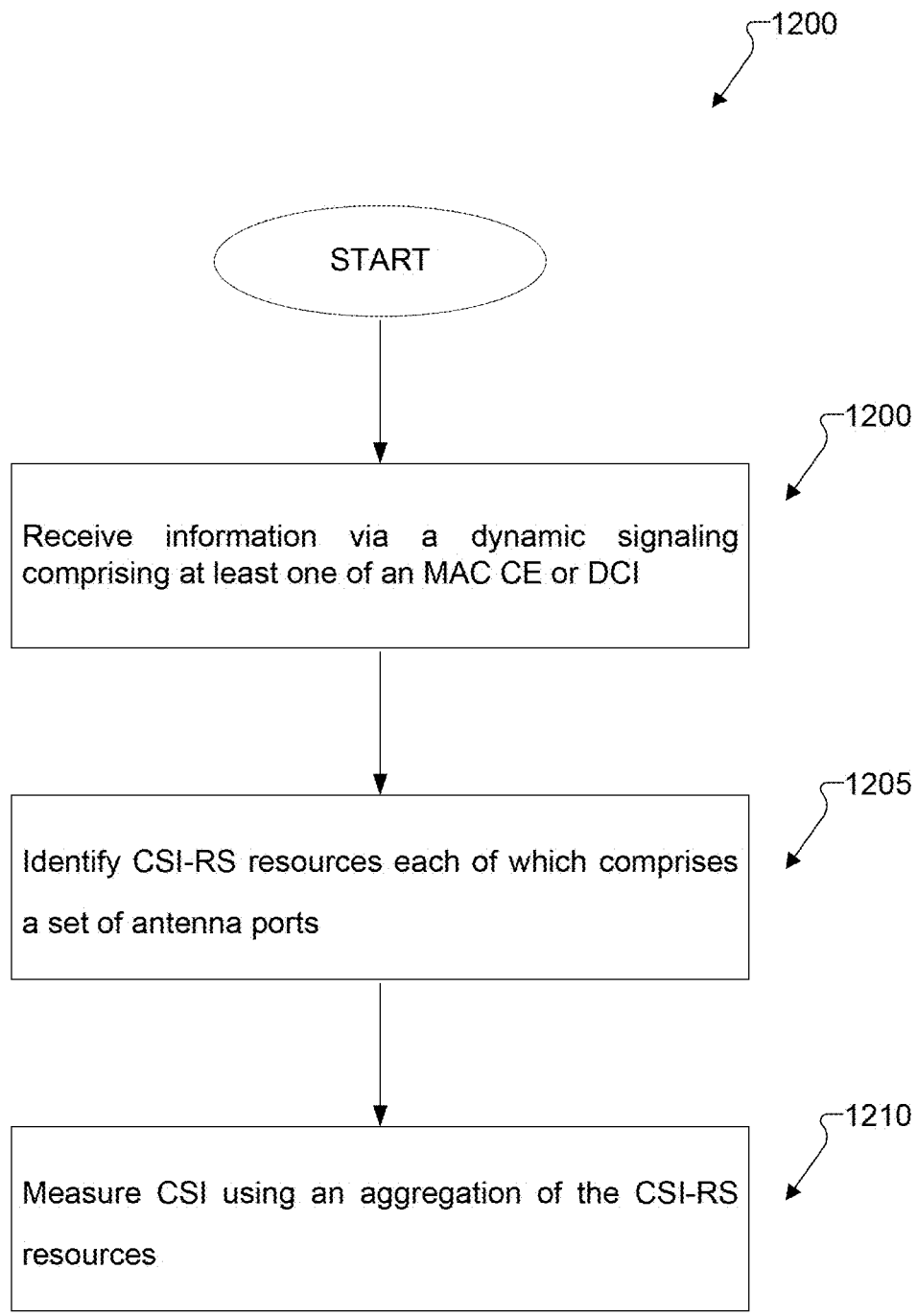
FIG. 12 illustrates another flow chart of a method for feedback signals according to embodiments of the present disclosure.

FIG. 12 illustrates another flow chart of a method 1200 for feedback signals according to embodiments of the present disclosure, as may be performed by a user equipment (UE).

As shown in FIG. 12, the method 1200 begins at step 1205. In step 1205, the UE receives, from a base station (BS), information via a dynamic signaling comprising at least one of a medium access control channel element (MAC CE) or downlink control information (DCI) that includes information for a set of channel state information-reference signal (CSI-RS).

In some embodiments, the UE in step 1205 receives the information via a radio resource control (RRC) signaling.

In such embodiments, EPRE ratio information per each of the CSI-RS resources is indicated in at least one of an aperiodic CSI-RS triggering or an aperiodic CSI report triggering.

In such embodiments, the EPRE ratio configured to each of the CSI-RS resource is selected from a set of variable values configured via an RRC signaling.

Subsequently, in step 1210, the UE identifies CSI-RS resources each of which comprises a set of antenna ports based on the information.

Finally, in step 1215, the UE measures CSI using an aggregation of the CSI-RS resources, wherein an energy per resource element (EPRE) ratio between a CSI-RS and a physical downlink shared channel (PDSCH) is configured in the information to each of the CSI-RS resources comprising the aggregated CSI-RS resources.

In some embodiments, the UE as shown in FIG. 12 determines a dedicated physical random access channel (PRACH); transmits, to the BS, an uplink signaling through the PRACH; and receives, from the BS, a random access response (RAR) including a set of CSI-RS antenna ports that is used by the UE to measure CSI acquisition.

In some embodiments, the UE as shown in FIG. 12 determines a dedicated PRACH preamble based on a physical downlink control channel (PDCCH) order; and transmits the dedicated PRACH preamble over an uplink channel.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) comprising:
   a transceiver configured to receive, from a base station (BS) in a cell comprising antenna elements distributed within the cell, information, via a dynamic signaling comprising at least one of a medium access control channel element (MAC CE) or downlink control information (DCI), that indicates a set of channel state information-reference signal (CSI-RS) resources; and a processor operably connected to the transceiver, the processor configured to:

identify CSI-RS resources, each of which comprises a set of antenna ports, based on the received information, wherein the set of antenna ports is configured based on a cluster of multiple of the distributed antenna elements, the multiple distributed antenna elements clustered based on intercell interference mitigation, wherein the cluster of distributed antenna elements includes (i) first antenna elements clustered based on a path loss to the UE and (ii) second antenna elements corresponding to one or more other UEs that meet an interference condition; and measure CSI using an aggregation of the CSI-RS resources, wherein an energy per resource element (EPRE) ratio between the CSI-RS resources and an associated physical downlink shared channel (PDSCH), respectively, is configured in the received information indicating the CSI-RS resources, wherein clustering of the cluster of multiple distributed antenna elements and the inter cell interference mitigation are based on antenna sharing radius that is larger than a radius of the cell.

2. The UE of claim 1, wherein the transceiver is further configured to receive the information via a radio resource control (RRC) signaling.

3. The UE of claim 1, wherein:
the processor is further configured to determine a dedicated physical random access channel (PRACH); and
the transceiver is further configured to:
transmit, to the BS, an uplink signaling through the PRACH; and
receive, from the BS, a random access response (RAR) including a set of CSI-RS antenna ports that is used by the UE to measure CSI acquisition.

4. The UE of claim 1, wherein:
the processor is further configured to determine a dedicated physical random access channel (PRACH) preamble based on a physical downlink control channel (PDCCH) order; and
the transceiver is further configured to transmit the dedicated PRACH preamble over an uplink channel.

5. The UE of claim 1, wherein:
EPRE ratio information per each of the CSI-RS resources is indicated in at least one of an aperiodic CSI-RS triggering and an aperiodic CSI report triggering; and
the EPRE ratio configured for each of the CSI-RS resources is selected from a set of variable values configured via an RRC signaling.

6. The UE of claim 1, wherein:
the cluster of multiple distributed antenna elements is dynamically allocated at a same time to a plurality of UEs including the UE and the one or more other UEs, and
at least one of the distributed antenna elements in the cluster is shared by a different UE in another cell.

7. The UE of claim 1, wherein:
the interference condition comprises a mutual signal-to-interference ratio (SIR) between the UE and the one or more other UEs being below a threshold, and
if the interference condition is met, the first antenna elements corresponding to the UE and the second antenna elements corresponding to the one or more other UEs are merged in the cluster of multiple distributed antenna elements.

8. A base station (BS) comprising:
antenna elements distributed within a cell of the BS;
a processor configured to:
cluster multiple of the distributed antenna elements based on intercell interference mitigation to include (i) first antenna elements based on a path loss to a user equipment (UE) and (ii) second antenna elements corresponding to one or more other UEs that meet an interference condition, wherein clustering of the cluster of multiple distributed antenna elements and the inter cell interference mitigation are based on antenna sharing radius that is larger than a radius of the cell; and
generate information indicating channel state information-reference signal (CSI-RS) resources each of which comprises a set of antenna ports, wherein the set of antenna ports is configured based on the cluster of multiple distributed antenna elements; and a transceiver operably connected to the processor, the transceiver configured to transmit, to the UE, the information via a dynamic signaling comprising at least one of a medium access control channel element (MAC CE) or downlink control information (DCI) that indicates the CSI-RS resources, wherein an aggregation of the CSI-RS resources is performed; and wherein energy per resource element (EPRE) ratio between the CSI-RS resources and an associated physical downlink shared channel (PDSCH), respectively, is configured in the transmitted information indicating the CSI-RS resources.

9. The BS of claim 8, wherein the transceiver is further configured to transmit the information via a radio resource control (RRC) signaling.

10. The BS of claim 8, wherein:
the processor is further configured to determine a dedicated physical random access channel (PRACH); and
the transceiver is further configured to:
receive, from the UE, an uplink signaling through the PRACH; and
transmit, to the UE, a random access response (RAR) including a set of CSI-RS antenna ports that is used by the UE to measure CSI acquisition.

11. The BS of claim 8, wherein:
the transceiver is further configured to receive a dedicated physical random access channel (PRACH) preamble that is received at more than one antenna port; and
the processor is further configured to determine the set of antenna ports to be associated with the UE.

12. The BS of claim 8, wherein:
the processor is further configured to identify the cluster of multiple distributed antenna elements that is dynamically allocated at a same time, by the BS, to a plurality of UEs including the UE and the one or more other UEs, and
at least one of the distributed antenna elements in the cluster is shared by a different UE in another cell.

13. The BS of claim 8, wherein EPRE ratio information per each of the CSI-RS resources is indicated in at least one of an aperiodic CSI-RS triggering or an aperiodic CSI report triggering.

14. The BS of claim 8, wherein the EPRE ratio configured to each of the CSI-RS resources is selected from a set of variable values via an RRC signaling.

15. A method for a user equipment (UE), the method comprising:
receiving, from a base station (BS) in a cell comprising antenna elements distributed within the cell, information via a dynamic signaling comprising at least one of a medium access control channel element (MAC CE) or downlink control information (DCI) that indicates a set of channel state information-reference signal (CSI-RS) resources;

identifying CSI-RS resources each of which comprises a set of antenna ports based on the received information, wherein the set of antenna ports is configured based on a cluster of multiple of the distributed antenna elements, the multiple distributed antenna elements clustered based on intercell interference mitigation, wherein the cluster of distributed antenna elements includes (i) first antenna elements clustered based on a path loss to the UE and (ii) second antenna elements corresponding to one or more other UEs that meet an interference condition; and measuring CSI using an aggregation of the CSI-RS resources, wherein an energy per resource element (EPRE) ratio between the CSI-RS resources and an associated physical downlink shared channel (PDSCH), respectively, is configured in the received information indicating the CSI-RS resources, wherein clustering of the cluster of multiple distributed antenna elements and the inter cell interference mitigation are based on antenna sharing radius that is larger than a radius of the cell.

16. The method of claim 15, further comprising receiving the information via a radio resource control (RRC) signaling.

17. The method of claim 15, further comprising:

determining a dedicated physical random access channel (PRACH);

transmitting, to the BS, an uplink signaling through the PRACH; and receiving, from the BS, a random access response (RAR) including a set of CSI-RS antenna ports that is used by the UE to measure CSI acquisition.

18. The method of claim 15, further comprising:

determining a dedicated physical random access channel (PRACH) preamble based on a physical downlink control channel (PDCCH) order; and transmitting the dedicated PRACH preamble over an uplink channel.

19. The method of claim 15, wherein:

EPRE ratio information per each of the CSI-RS resources is indicated in at least one of an aperiodic CSI-RS triggering and an aperiodic CSI report triggering; and the EPRE ratio configured to each of the CSI-RS resource is selected from a set of variable values configured via an RRC signaling.

20. The method of claim 15, wherein:

the cluster of multiple distributed antenna elements is dynamically allocated at a same time to a plurality of UEs including the UE and the one or more other UEs, and at least one of the distributed antenna elements in the cluster is shared by a different UE in another cell.

* * * * *